INVENTOR.
PALMER M. MAXWELL

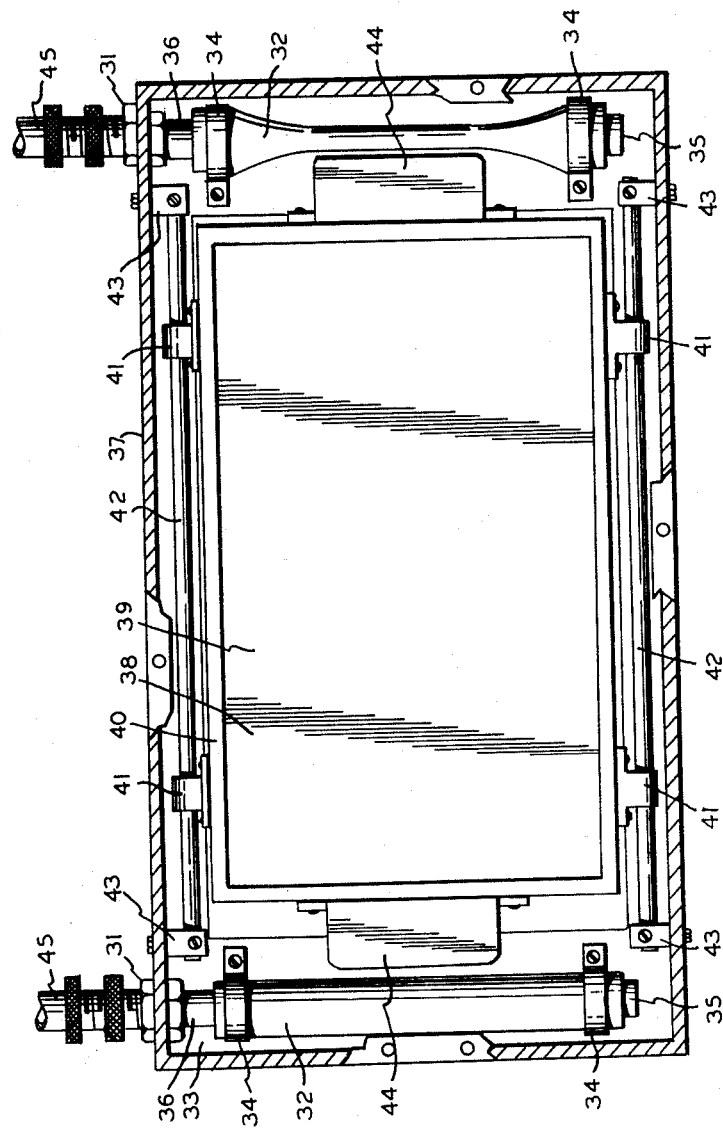

Jan. 5, 1965 P. M. MAXWELL 3,163,989
APPARATUS FOR IMPARTING RECIPROCATING MOTION TO A STRUCTURE
Filed April 26, 1961 6 Sheets-Sheet 3

*INVENTOR.*
PALMER M. MAXWELL
BY
ATTORNEY

Jan. 5, 1965 P. M. MAXWELL 3,163,989
APPARATUS FOR IMPARTING RECIPROCATING MOTION TO A STRUCTURE
Filed April 26, 1961 6 Sheets-Sheet 4

INVENTOR.
PALMER M. MAXWELL
BY Harold D Jones Jr
ATTORNEY

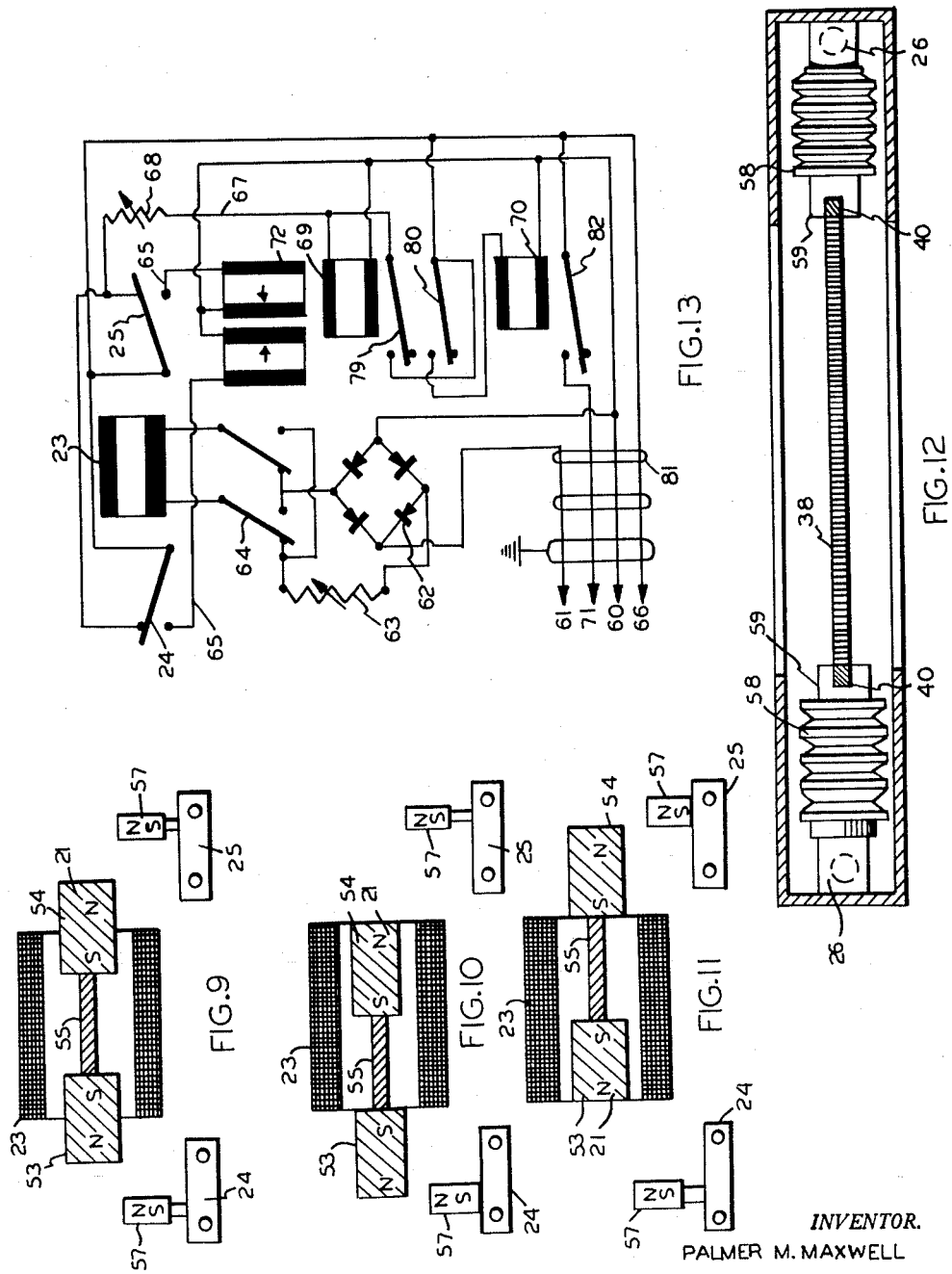

Jan. 5, 1965   P. M. MAXWELL   3,163,989
APPARATUS FOR IMPARTING RECIPROCATING MOTION TO A STRUCTURE
Filed April 26, 1961   6 Sheets-Sheet 6
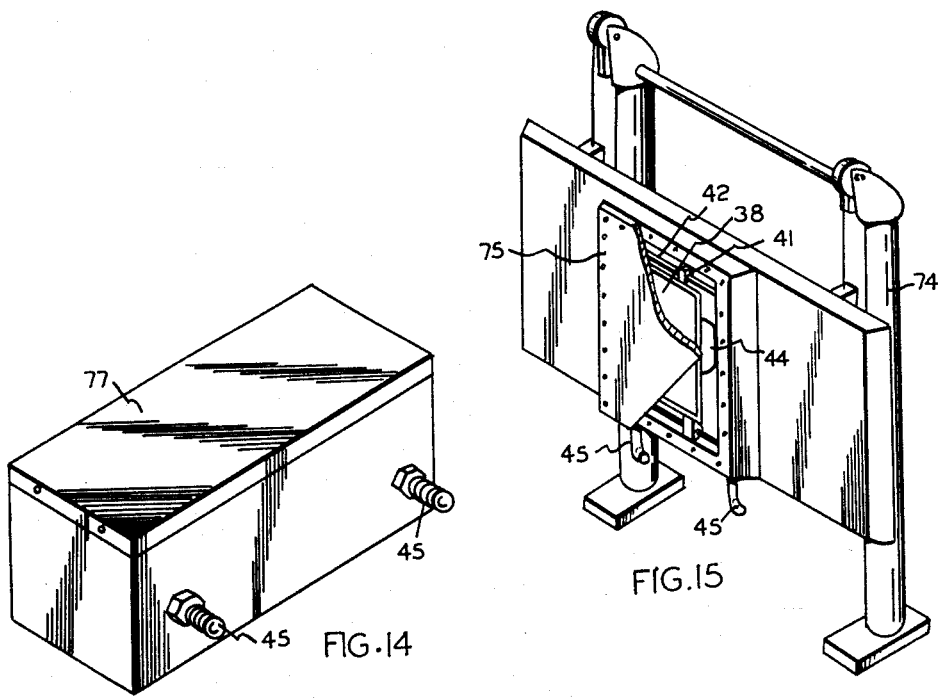
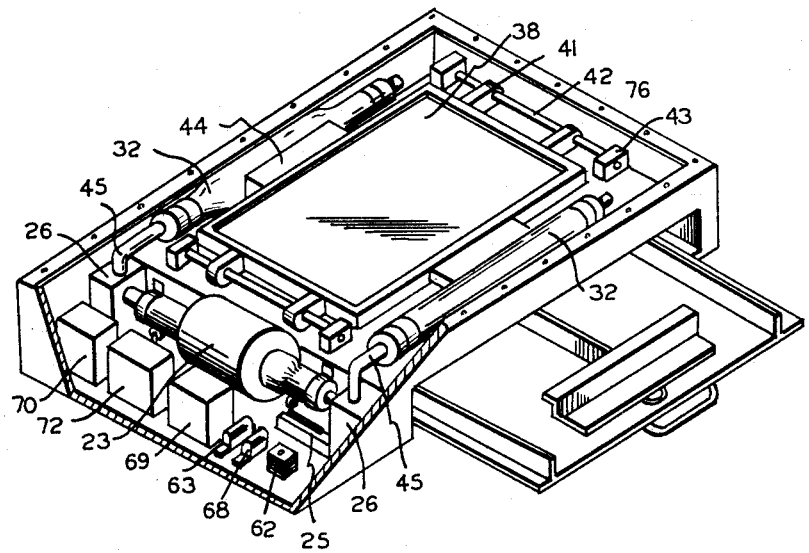
INVENTOR.
PALMER M. MAXWELL
BY Harold D Jones Jr
ATTORNEY

United States Patent Office 3,163,989
Patented Jan. 5, 1965

3,163,989
APPARATUS FOR IMPARTING RECIPROCATING MOTION TO A STRUCTURE
Palmer M. Maxwell, 522 E. 46th St., Savannah, Ga.
Filed Apr. 26, 1961, Ser. No. 105,710
9 Claims. (Cl. 60—54.5)

This invention relates to an apparatus for imparting reciprocating motion to a structure, and more particularly to an apparatus for imparting reciprocating motion to the grid structure of an X-Ray Bucky Diaphragm.

Although there are many applications in which it is desired to provide reciprocating motion of a particular magnitude and frequency to a structure, one of the most exacting insofar as motion control is concerned, is that application involving the imparting of reciprocating motion to the grid structures of X-Ray Bucky Diaphragms. This is because such grid structure motion must be carefully coordinated with the X-ray film exposure procedure. Therefore, a device capable of attaining the reciprocating motion required for the grid structures of X-Ray Bucky Diaphragms will be capable of providing the reciprocating motion required for most other applications. Thus, although the invention described herein is described with particular reference to the reciprocating motion used with X-Ray Bucky Diaphragms, it has broad application.

The reason for imparting reciprocating motion to grid structures of X-Ray Bucky Diaphragms and the nature of this motion will be more clearly understood if the purpose of grid structures is first reviewed. It is well-known that X-ray beams passing through an object will be partially re-emitted from the object as scattered radiation diffusing in all directions, and that if this scattered radiation is allowed to strike the X-ray film, it will give rise to a blurred pattern superimposed on the radiographic image. Therefore, it is highly desirable that some means be provided to permit the passage of primary X-ray beams to the X-ray film while at the same time eliminating or greatly reducing the passage of scattered radiation to the X-ray film. It is exactly this function that the X-Ray Bucky Diaphragm is intended to accomplish since its grid is constructed to permit the passage of only primary X-ray beams to the X-ray film.

To accomplish the blocking of scattered radiation from the X-ray film, present day X-Ray Bucky Diaphragm grids are constructed with a plurality of radiopaque lead strips separated from each other by radiotransparent material such as plastic or aluminum to obtain a wafer-type structure of the particular overall dimensions desired. This wafer-type structure consisting of alternate radiopaque and radiotransparent material is often covered with a thin protective covering of plastic, aluminum or other radiotransparent material to provide for rigidity and to protect the grid structure from mechanical damage. Considering that the length and thickness of the lead strips are those strip dimensions which are generally perpendicular to the path of the primary X-ray beam and that the width is that strip dimension extending generally parallel to the primary beam path, it is apparent that length depends upon the dimensions of the wafer and that thickness is minimized in order to position the minimum radiopaque material in the path of the primary X-ray beam. On the other hand, significant width is a desirable property of the strip since it will not influence or block the primary X-ray beam because of its parallel path, but will present a large radiation absorbent surface or strip side defined by strip length and width to scattered radiation not following the path of the primary X-ray beam.

Although most grid structures for Bucky Diaphragms would conform to this general description, there are differences between various grid structures with regard to the number of radiopaque lead strips used per unit of area and with regard to the positioning of the sides of the strips. However, when side positioning only is considered, most commonly used grid structures for Bucky Diaphragms can be classified as either parallel or focused. In a parallel grid structure, the sides of the lead strips are placed in planes which are substantially parallel to each other while in the focused grid structure, the sides of the lead strips are placed in planes which upon extension would intersect at the source of X-ray radiation.

It is apparent that the focused grid structure provides a consistent opportunity for the passage of primary X-ray beams throughout its area because the absorbing sides of its strips are always parallel to the path of such beams and that the parallel grid structure will tend to cut off primary radiation as well as scattered radiation toward the outer edges of the grid structure because the path of the primary radiation becomes less and less parallel to the sides of the strips as the outer edges are approached. However, primary radiation cut-off with a focused grid structure is as bad, if not worse than, with a parallel grid if the focused grid structure is not properly positioned since as a focused grid structure moves out of proper position, the sides of the lead strips will no longer be properly oriented toward the source of X-ray radiation and the primary radiation will tend to strike the sides of the strips. Moreover, it is apparent that with both parallel grid structures and out of position focused grid structures, the primary radiation cut-off becomes greater with an increase in strips per unit of area and strip width since both of these grid structure parameters tend to reduce the angle with which radiation may approach the gap between strips and not strike the strip sides.

On the other hand, it is well recognized that for the same reason, the greater the number of strips per unit area and the greater the width of the strips, the more effective the suppression of scattered radiation by the grid structure. This is expressed in a simple relationship by what is known as a Bucky Grid Ratio. This is the ratio of the width of the lead strips to the distance between them. Bucky Diaphragm grid structures having Bucky Grid Ratios varying from five to one to sixteen to one are currently available with strips per unit area varying from forty strips per inch to one hundred strips per inch. This paradox resulting from the fact that the grid structure parameters which are most effective for the reduction of scattered radiation also tend to reduce primary radiation limits the effectiveness of parallel grid structures and requires accurate positioning of both parallel and focused grid structures with respect to the radiation source in order to minimize the inherent cut-off of parallel grids and the out of position cut-off of focused grids.

In many applications careful positioning can be attained by simply placing the grid structure in a stationary position between the object to be radiographed and the X-ray film. This will result in the maximum unabsorbed passage between the lead strips of the primary radiation and the maximum absorption of the diffused radiation. Unfortunately, it will also result in the appearance of the grid structure pattern on the X-ray film because of the blocking of primary radiation by the length and thickness of the lead strips.

It has been known for many years that motion of the grid structure of a Bucky Diaphragm during X-ray exposure will eliminate objectionable projected grid line patterns from the X-ray film. It is obvious that to accomplish this, the motion must be of sufficient amplitude to move the grid structure a distance at least equal to the thickness of the lead strips in the grid structure during the time of X-ray exposure. However, it is also obvious from what has been said above, that the grid structure motion must not be so great as to move the grid structure into positions where the inherent primary beam cut-off of parallel grid structures is accentuated and focused grid structures are caused to be substantially out of focus with the X-ray source. Moreover, it has been found that best results in obtaining this motion are accomplished by starting grid structure motion prior to the starting of X-ray film exposure and by terminating grid structure motion after the completion of X-ray film exposure.

In the past, numerous devices or arrangements of apparatus have been used to obtain the motion required for grid structures of Bucky Diaphragms. One of the earliest arrangements is that found in the single stroke X-Ray Bucky Diaphragm which was in use for many years and which is still commercially available. In this device, the desired grid structure motion is obtained by using a movable grid carriage which is moved in one direction by a spring driven mechanism acting against the resistance offered by an air cylinder having a relief valve. The speed of motion of the movable carriage is determined by adjusting the relief valve to permit faster or slower escape of air from the air cylinder. In addition, micro-switches are positioned so as to be actuated by the motion of the carriage after initiation and prior to the termination of its motion in order to obtain the initiation and termination of X-ray exposure during the period of grid structure travel. In essence, the single stroke variety of X-Ray Bucky Diaphragm is exactly what the name implies in that it simply provides for the motion of the grid structure in a single direction during the period of X-ray exposure. Among the limitations of such a device are the required cocking of the spring driven mechanism prior to each X-ray exposure and the setting of different exposure times into the apparatus by a dial adjustment of the escape of air from the air cylinder. This latter limitation is particularly significant since it emphasizes the further limitation that in order to coordinate X-ray exposure time with grid structure motion, exposure time is controlled by the time of grid structure motion rather than by some more accurate means associated directly with the X-ray source.

The reciprocating Bucky Diaphragm was introduced to overcome the necessity for the dial setting of X-ray exposure times and the control of the duration of X-ray exposure by the time of grid motion. Moreover, it eliminates the necessity of manual recocking of the spring driven mechanism before each X-ray exposure. In this type of arrangement, a grid structure motion of relatively short length and time duration is established by using a direct current magnet to automatically return the spring driven mechanism to cocked position following each stroke. The X-ray exposure is initiated on the first stroke and continues during subsequent strokes until terminated by an exposure time control not associated with the time or total length of grid motion. Thus, for a particular X-ray exposure, the grid structure of a Bucky Diaphragm is repeatedly spring driven in one direction and returned in the opposite direction to the re-set position by a direct current magnet. The reciprocating motion obtained by this apparatus satisfactorily eliminates the grid pattern in many X-ray applications without the limitations mentioned above with reference to the single stroke Bucky Diaphragm. However, it is apparent that noise and vibration or jarring are inherent in this method of attaining reciprocating motion and that the magnet and associated electrical components make it dangerous to use in environments where there are explosive gases such as in hospital operating rooms and make it difficult to use in environments which would damage electrical or mechanical mechanisms. Moreover, motion of the grid structure which is at least equal in magnitude to the thickness of the lead strips in the grid structure cannot be obtained with this apparatus for very short exposure times.

A more recent apparatus for imparting motion to the grid structure of a Bucky Diaphragm is the so-called Recipromatic X-Ray Bucky Diaphragm now generally in use. This apparatus utilizes a reversible electric motor whose drive shaft drives a pulley and cord arrangement connected to the sides of the grid carriage. Reciprocating motion is achieved by using properly positioned micro-switches which cause the appropriate motor reversal. Although permitting greater speed of reciprocating motion than is possible with the simple reciprocating Bucky Diaphragm described above, speed of motion is nevertheless limited. Moreover, the apparatus does not completely eliminate noise and vibration or jarring and does not readily permit the location of electrical power sources and motion control components in positions remote from the environment of the grid structure.

From the foregoing, it is apparent that present arrangements of apparatus for providing the motion necessary to eliminate the projected grid pattern associated with the use of Bucky Diaphragms have many limitations. The present invention completely eliminates these undesirable limitations by providing an apparatus capable of imparting reciprocating motion to a structure with a minimum of noise and vibration or jarring associated with its operation. Moreover, the apparatus permits the grid structure of a Bucky Diaphragm to be substantially isolated from any mechanical, electrical or other means used to generate the desired reciprocating motion and from any electrical components necessary for the control of the frequency and length of such reciprocating motion. This feature permits the use of the apparatus described herein not only in applications where space for the Bucky Diaphragm unit is limited and it is desired to have a Bucky Diaphragm unit of minimum overall size, but also in those applications where electrical connections or components in the immediate area of the Bucky Diaphragm unit would be hazardous because of the presence of explosive gases, as for example in hospital operating rooms. This feature of the apparatus also permits the imparting of reciprocating motion to structures under water and in other environments which tend to damage mechanical or electrical components if relatively elaborate precautions are not taken. In addition to the foregoing features, the invention described herein is readily adaptable to a variety of speeds and amplitudes of reciprocating motion which can be conveniently changed.

These and other features of the invention will be more clearly understood from the following detailed description and the accompanying drawings in which like characters designate corresponding parts in all figures and in which:

FIGURE 2 is a top plan view of a preferred embodiment of the pressure responsive device positioned inside a Bucky grid housing shown in section and showing the components of the pressure responsive device as they appear when the grid structure has been moved to the right in the figure.

FIGURE 9 is a sectional view taken in a line of motion of the rod and through the solenoid and rod and shows rod and microswitch positions when the solenoid is not energized and fluid pressure on both ends of the rod is equal.

FIGURE 10 is a sectional view taken in a line of motion of the rod and through the solenoid and rod and shows rod and microswitch positions when the solenoid is energized and is forcing the rod to the left in the figure.

FIGURE 11 is a sectional view taken in a line of motion of the rod and through the solenoid and the rod and shows rod and microswitch positions when the solenoid is energized and is forcing the rod to the right in the figure.

FIGURE 12 is a sectional view taken in a line of motion of the grid structure through the housing of a Bucky Diaphragm and shows an alternate preferred embodiment of the pressure responsive device in which the conduits have been replaced by bellows.

FIGURE 13 is a schematic diagram showing the electrical relationship of the various components of an apparatus comprised of a pressure generating device and a pressure responsive device and used to impart reciprocating motion to the grid structure of a Bucky Diaphragm.

FIGURE 14 is a perspective view of a housing or cabinet containing a pressure generating device only and showing the leads extending therefrom.

FIGURE 15 is a perspective view of a conventional vertical cassette changer showing an X-Ray Bucky Diaphragm having a portion of its top cut away to show a pressure responsive device and showing the leads from the pressure responsive device to a remotely located pressure generating device such as that shown in FIGURE 14.

FIGURE 16 is a perspective view of an X-Ray Bucky Diaghragm housing with portions cut away and showing both a pressure generating device and a pressure responsive device located in the housing adjacent to the grid structure.

Figure 1:
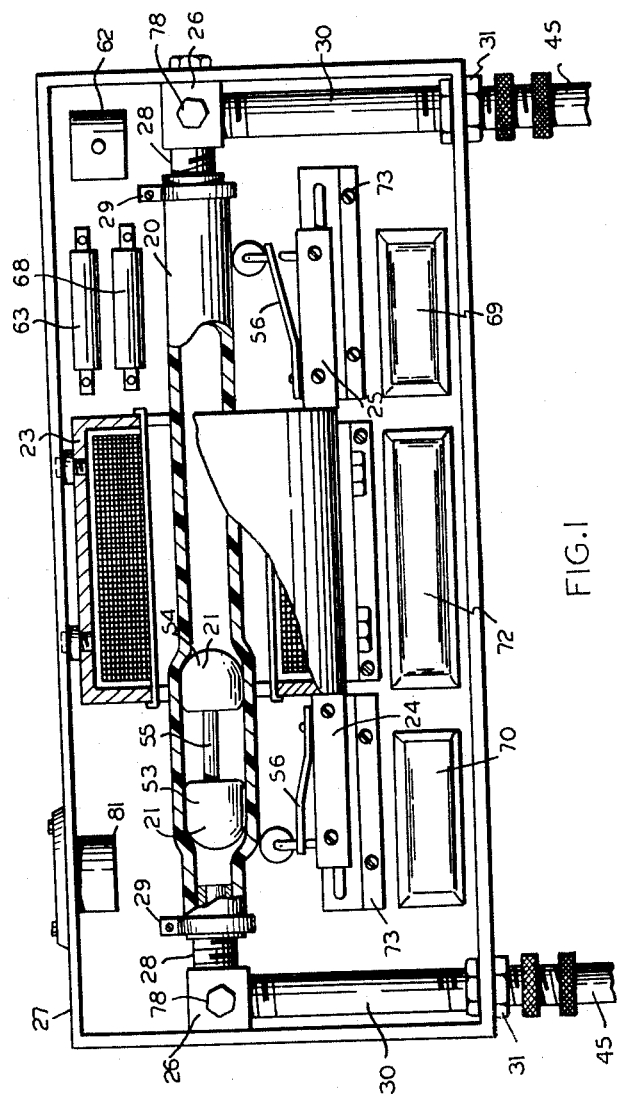
FIGURE 1 is a top plan view of a preferred embodiment of the pressure generating device and in which portions of the solenoid and the tube are cut away to more clearly show the relationship of the rod to the other components of the device.

These figures and the following detailed description disclose several preferred specific embodiments of this invention, but the invention is not limited to the details disclosed since it may be embodied in other equivalent forms.

The invention described herein is most easily understood by considering the apparatus for imparting reciprocating motion to a structure as consisting of a pressure generating device connected to a pressure responsive device. It is the purpose of the pressure generating device to provide positive fluid pressure in one of two leads simultaneously with an equal negative fluid pressure or vacuum in the other lead. In addition, the pressure generating device provides for the convenient reversing of the types of fluid pressure in the two leads a plurality of times. Thus, the fluid pressure effect in the two leads can be described as the alternate increasing and decreasing of fluid pressure in one lead simultaneously with the alternate decreasing and increasing of fluid pressure in the other lead. These fluid pressure pulsations in the leads are conducted by the leads to a pressure responsive device associated with a grid structure where the pulsating fluid pressures are used to impart reciprocating motion to the grid structure.

This reciprocating motion of the grid structure in response to the pulsating fluid pressures from the pressure generating device is achieved by using two pressure responsive components which tend to expand with an increase in fluid pressure or volume and to contract with a decrease in fluid pressure or volume and which are physically located with reference to the grid structure so that the expansion of one and the contraction of the other will move the grid structure in a particular direction. In one particular embodiment of the pressure responsive device, these fluid pressure responsive components consist of two resilient conduits placed on opposite sides of the slidably mounted grid carriage of a Bucky Diaphragm so that opposite and simultaneous changes in their cross sections resulting from alternate increases and decreases in the fluid pressure in each will impart reciprocating motion to the grid structure. The use of these conduits provides a reciprocating motion which has a minimum of noise and vibration or jarring.

Moreover, it is apparent that the apparatus as a whole provides a pressure generating device which can be remotely located from the actual grid structure and which must be connected to the grid structure and the pressure responsive device associated with the grid structure only by the two leads containing the pulsating fluid pressure. Therefore, the apparatus is not only free of the noise and vibration or jarring associated with various mechanical arrangements for imparting reciprocating motion to structures, but it is particularly adapted for imparting reciprocating motion to a structure in a hazardous or component damaging environment since only the pressure responsive device must be located in such an environment. The amplitude and frequency of the reciprocating motion are controlled by switches and other components of the pressure generating device. Thus, if the pressure generating device is located remote from the pressure responsive device, these components cannot cause explosions in or be damaged by the environment of the moving structure.

The advantages of the apparatus are more clearly shown by a detailed consideration of several specific embodiments of the apparatus. For example, FIGURE 1 shows a preferred embodiment of the pressure generating device with its basic components and it can be seen that among these basic components is a resilient tube 20 which serves as a cylinder into which a rod component 21 is inserted. This rod component 21 serves not only as a fluid pressure generating piston when the tube 20 is filled with fluid, but also serves as an electromagnetic plunger since the tube 20 and the inserted rod component 21 are enclosed by a solenoid 23. Moreover, the diameter of the rod component 21 is greater than the inside diameter of the tube 20. Therefore, its presence inside the tube 20 makes the tube 20 bulge and this bulge in the tube 20 is used to actuate microswitches 24 and 25. In essence, the foregoing components provide a pressure generating device in which the electromagnetic field of a solenoid 23 causes the rod component 21 to move as a pressure generating piston inside the tube 20 and to actuate either microswitch 24 or 25 as it moves. Thus, the movement of the rod component 21 not only simultaneously increases and decreases fluid pressure by decreasing the volume of the tube 20 toward one of its ends while increasing the volume of the tube 20 toward its other end, but the rod component 21 also actuates microswitches which can be used to control its own motion.

The foregoing described components are utilized to attain an effective fluid pressure output by positioning the tube 20 between two pipe fittings 26 which are bolted to the housing 27. This positioning is accomplished in the specific embodiment shown in FIGURE 1 by using pipe nipples 28 extending from the pipe fittings 26 to which the tube 20 ends are clamped by clamps 29. Each of the pipe fittings 26 has a pipe extension 30 extending from the interior of the pipe fitting 26 to and through the side of the housing 27 where its end is locked into position with a lock nut 31. Thus, if the interiors of the tube 20, the pipe nipples 28, the pipe fittings 26 and the pipe extensions 30 are filled with compression resistant fluid, the changes in fluid pressure resulting from the motion of the rod component 21 inside the tube 20 will appear as opposite fluid pressures at the ends of the pipe extensions 30 extending outside the housing 27. From the ends of pipe extensions 30 these opposite fluid pressures may be conveniently transmitted to any device responsive to such pressures.

Such a device is shown in FIGURE 2 which shows a particular embodiment of a pressure responsive device for imparting reciprocating motion to the grid structure of a Bucky Diaphragm. This function is accomplished by slidably mounting the grid structure 38 of a Bucky Diaphragm for motion between two semi-rigid but collapsible plastic conduits 32 which are clamped to the Bucky Diaphragm frame 33 by clamps 34. Each of these conduits 32 has one of its ends plugged with a plug 35 and has its other end associated with one end of a pipe extension 36 which extends to and through the side of the housing 37 of the Bucky Diaphragm where it is locked into position by a lock nut 31. It is apparent that if the extending ends of the pipe extensions 30 are connected by hollow leads 45 to the extending ends of the pipe extensions 36 and all components filled with compression resistant fluid, the shifting pressures in the pressure generating device resulting from the motion of the rod component 21 will cause corresponding increases and decreases of fluid pressure in the conduits 32. These increases and decreases of fluid pressure in conduits 32 are used to impart reciprocating motion to the grid structure 38 of a Bucky Diaphragm consisting of the grid 39 mounted in a grid frame 40. The grid frame 40 is arranged for such motion by using four bearings 41 arranged to slide on rods 42 which are attached by brackets 43 to the Bucky Diaphragm housing 37. Actuator bars 44 are provided at each of the two edges of the grid frame 40 which are adjacent to the conduits 32 in order to provide for tight physical contact between the grid frame 40 and the surfaces of the conduits 32.

Figure 3:
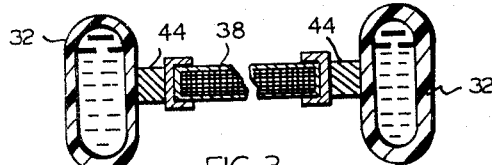
FIGURE 3 is a sectional view taken in a line of reciprocating motion of the grid structure and through the grid structure and the positioning conduits and showing the cross sectional configuration of the positioning conduits when the grid structure is at mid point of motion in either direction.
Figure 4:
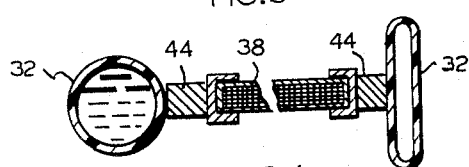
FIGURE 4 is a sectional view taken in a line of reciprocating motion of the grid structure and through the grid structure and the positioning conduits and showing the cross sectional configuration of the positioning conduits when the grid structure has been moved to substantially the position shown in FIGURE 2.
Figure 5:
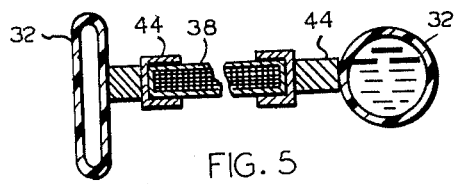
FIGURE 5 is a sectional view taken in a line of motion of the grid structure and through the grid structure and the positioning conduits and showing the cross sectional configuration of the positioning conduits when the grid structure has been moved to the position opposite to that shown in FIGURE 2.

The action of the conduits 32 when imparting reciprocating motion to the grid structure 38 of a Bucky Diaphragm is shown in FIGURES 3, 4 and 5. For example, in FIGURE 3 the cross sections of the conduits 32 when the grid structure 38 is centered at mid point between the conduits 32 are shown and it can be seen that the conduits 32 are both compressed an equal amount. When the conduits 32 are in this condition, the rod component 21 is in equilibrium position in the tube 20 and is exerting equal pressure on the compression resistant fluid on either side of it in the apparatus. Moreover, if the rod component 21 is shifted from this position in the tube 20 by the influence of the solenoid 23, the shift of the rod component 21 will increase the fluid pressure in one conduit 32 and decrease the fluid pressure in the other conduit 32 by an equal amount. Such a change in fluid pressure is shown in FIGURE 4 where the left hand conduit 32 is the one toward which the rod component 21 has shifted. It can be seen that when this pressure change occurs, the left hand conduit 32 becomes circular in cross section and the right hand conduit 32 collapses.

As a result of this action of the conduits 32, the grid structure 38 is shifted away from the expanding left hand conduit 32 toward the collapsing right hand conduit 32.

Similarly, if the rod component 21 is driven in the opposite direction by the influence of the solenoid 23, the type of fluid pressure being exerted on the conduits 32 will be reversed and the cross sections of the conduits 32 will change from those shown in FIGURE 4 to those shown in FIGURE 5 and the grid structure 38 will be shifted in the opposite direction. It is apparent that when a pulsating pressure output is obtained from the pressure generating device by shifting the rod component 21 alternately in opposite directions, the action of the conduits 32 in response to this pressure output will cause a reciprocating motion of the grid structure 38. The frequency of the reciprocating motion will depend upon the frequency with which the direction of the rod component 21 is shifted and the amplitude of the reciprocating motion will depend upon the length of rod component 21 motion and the resulting degree of conduit 32 distortion. Thus, an apparatus consisting of a pressure generating device and pressure responsive device provides a highly effective means for imparting smooth reciprocating motion to the grid structure 38 of a Bucky Diaphragm. Moreover, it is obvious that a number of modifications of the apparatus are possible without sacrificing its many advantages.

Figure 6:
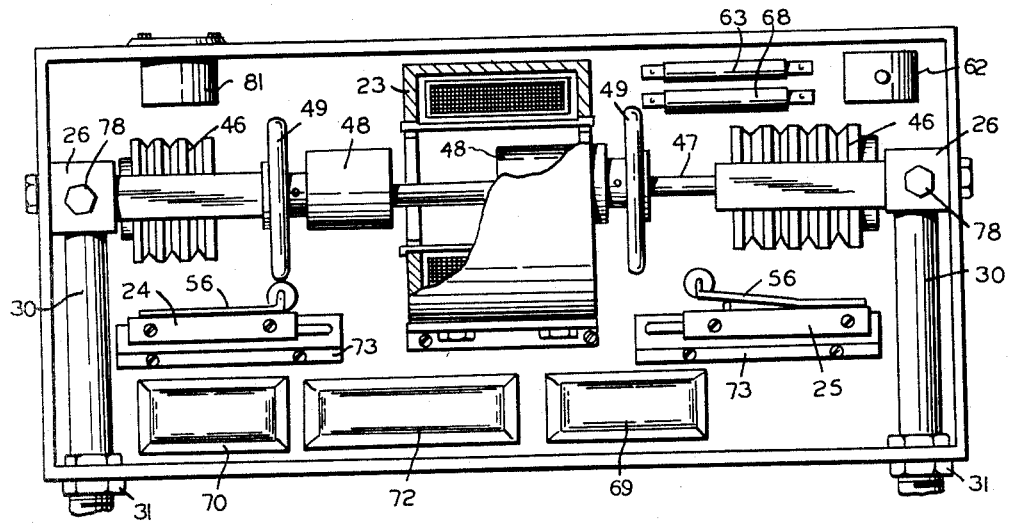
FIGURE 6 is a top plan view of an alternate preferred embodiment of the pressure generating device and in which a portion of the solenoid is cut away to more clearly show the relationship of the plunger to the other components of the device.

Such a modification of the pressure generating device of the apparatus is shown in FIGURE 6. In this particular modification, the combination of the tube 20 and the rod component 21 is replaced between the pipe fittings 26 by two bellows 46 mounted to the pipe fittings 26 and joined by shafts 47 to a solenoid plunger 48. The solenoid pluger 48 is positioned within the solenoid 23 and microswitch actuators 49 are placed at each end of the plunger 48 to accomplish microswitch actuation in the same manner as it is accomplished by the bulge in the tube 20. In operation, the plunger 48 is reciprocally moved by the field of the solenoid 23 and as a result, pressure is alternately applied to and removed from the fluid contained in the bellows 46 to provide the same pulsating output from the pressure generating device as that obtained with the tube 20 and the rod component 21 arrangement described above.

Figure 7:
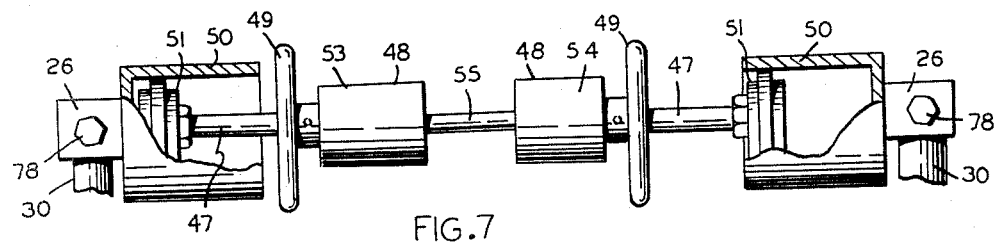
FIGURE 7 is a top plan view of an alternate preferred embodiment of the pressure generating device with portions of the cylinders cut away and in which the solenoid, the various microswitches and other components are not shown because they are similar in configuration and arrangement to those components shown in FIGURES 1, 6 and 8.

Another modification of the pressure generating device of the apparatus is shown in FIGURE 7. This version is similar to that shown in FIGURE 6 with the exception that the bellows 46 have been replaced by cylinders 50 and pistons 51. Thus, fluid pressures are obtained by the motion of the pistons 51 in the cylinders 50 and it is obvious that the pistons 51 in the cylinders 50 will in combination with other components already described and in a manner already described provide a pressure generating device having a pulsating output of fluid pressure.

Figure 8:
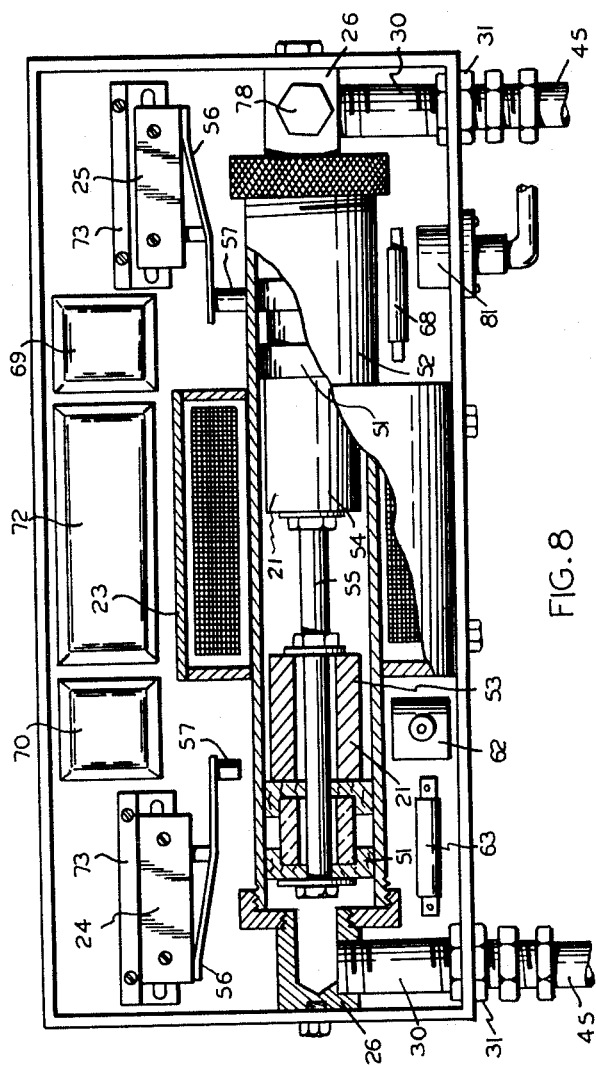
FIGURE 8 is a top plan view of an alternate preferred embodiment of the pressure generating device and in which portions of the solenoid and tube are cut away to more clearly show the relationship of the rod to the other components of the device.

Still another modification of the pressure generating device is shown in FIGURE 8. This modification combines the piston 51 of the modification just described with the rod in tube arrangement first described herein. However, in this modification the tube 52 is rigid and the rod component 21 with pistons 51 at both ends simply moves inside the tube 52 without causing a bulge. The pistons 51 are not only arranged to provide an effective fluid seal between their circumferences and the inner surface of the tube 52, but they support the rod component 21 between them.

Since the tube 52, the rod component 21 and pistons 51 are all surrounded by the solenoid 23, motion of the rod component 21 and its associated pistons 51 is accomplished in the same manner as previously described with reference to other modifications of the pressure generating device. However, the use of a rigid tube 52 completely enclosing the rod component 21 and pistons 51 eliminates microswitch actuators 49 as well as the bulge, and another means of actuating microswitches 24 and 25 must be provided with this modification. This is accomplished by using the magnetic properties of the rod component 21 in combination with a modification of the microswitches.

The actuation of microswitches 24 and 25 in the pressure generating device shown in FIGURE 8 will be more clearly understood if the magnetic properties of the rod component 21 are first considered. The rod component 21 is comprised of three segments. Two of these segments 53 and 54 are identical permanent magnets positioned so that poles of similar polarity extend into the area surrounded by the solenoid 23. The similar poles of segments 53 and 54 are joined by the shaft 55 which is the third segment of the rod component 21. It has been found that a rod component 21 constructed in this manner and whose permanent magnetic polarity remains stable in the field of the solenoid 23 is highly responsive to the field of the solenoid 23, and depending upon the polarity of the solenoid 23 field, will move in one direction or the other in the solenoid 23. Good results have been obtained by making the length of the shaft segment 55 of the rod component 21 approximately half the length of the solenoid 23.

It is apparent that the permanent magnetic properties of the rod component 21 can be used not only to obtain a rod component 21 responsive to solenoid 23 electromagnetic field changes, but that these same permanent magnetic properties can be used to influence components responsive to such properties. This fact is used to obtain microswitch actuation in the pressure generating device shown in FIGURE 8. In this particular pressure generating device the actuating arms 56 of the microswitches 24 and 25 have small permanent magnets 57 positioned at their ends adjacent to the tube 52. These magnets 57 are positioned so that their polarity nearest the tube 52 is the same as the polarity of the ends of the rod component segments 53 and 54 which extend away from the solenoid 23. Thus, these ends of the rod component segments 53 and 54 will repel the magnets 57 and operate the microswitches 24 and 25 when the segments 53 and 54 are moved by solenoid 23 into positions near the magnets 57.

This magnetic operation of microswitches 24 and 25 is shown in FIGURES 9, 10 and 11. In these figures it is assumed that rod component segments 53 and 54 are arranged so that their south poles are joined by shaft segment 55 and their north poles extend from the solenoid 23. In FIGURE 9, the solenoid 23 is not energized and equal fluid pressure is being exerted on both ends of the rod component 21. As a result, the rod component 21 is centered in the solenoid 23 and the rod component segments 53 and 54 are sufficiently remote from the magnets 57 to not significantly influence either of them. In FIGURE 10 the solenoid 23 has been energized and the rod component 21 shifted to the left in the figure. It can be seen that when this occurs the north polarity of the end of rod component segment 53 repels the magnet 57 associated with microswitch 24 and the microswitch 24 is operated. Similarly, when the polarity of the solenoid 23 is reversed by reversing current flow, the rod component 21 shifts to position shown in FIGURE 11 and the microswitch 25 is magnetically operated in the manner described.

It should be noted that the magnetic operation of microswitches 24 and 25 is possible with every embodiment of the pressure generating device described herein. This is because the rod component 21 shown in FIGURE 1 and the plungers 48 shown in FIGURES 6 and 7 are all constructed in the same manner as the rod component 21 in FIGURE 8. Although this means of construction is used principally to obtain response to the solenoid 23 in the manner described, it is apparent that it permits the use of magnetically operated microswitches with all pressure generating devices described herein. Moreover, it is equally apparent that the foregoing means of magnetically operating microswitches is adaptable to a variety of applications.

In FIGURE 12 a modification of the pressure responsive device is shown. In this modification the conduits 32 are replaced by two bellows 58. Since these bellows 58 are attached by brackets 59 to the grid frame 40 and are positioned on opposite sides of the grid structure 38 between the grid frame 40 and the pipe fittings 26, the alternate increasing and decreasing of the amount of fluid in one bellows 58 while simultaneously decreasing and increasing the amount of fluid in the other bellows 58 will impart a reciprocating motion to the grid structure 38.

Regardless of the particular modification of pressure generating device or pressure responsive device used in the apparatus, it follows that the initial setup of the apparatus is accomplished by positioning the conduits 32 or bellows 58 so that the conduits 32 or bellows 58 are in a half compressed state when the grid structure 38 is at rest in its mid position. In addition, the rod component 21 or plunger 48 is positioned at the mid point in its intended path of motion inside the solenoid 23. With the components in this position, the filler plugs 78 of the pipe fittings 26 are removed and sufficient compression resistant fluid added to the apparatus to completely fill all portions of the apparatus on both sides of the rod component 21 or plunger 48. When this amount of compression resistant fluid has been added and air bubbles removed, the filler plugs 78 are replaced in the pipe fittings 26 and the apparatus is ready for operation.

It is obvious that this apparatus can be used for providing reciprocating motion in a variety of applications and that in each application, the nature of the reciprocating motion will be dependent upon the frequency, speed and length of rod component 21 or plunger 48 motion as induced by solenoid 23 or some similar motion inducing force. When solenoid 23 is used to induce motion, the nature of rod component 21 or plunger 48 motion is determined by the amplitude, duration and direction of the current used to energize solenoid 23. In the specific embodiments described herein involving the use of the apparatus to impart reciprocating motion to the grid structure 38 of a Bucky Diaphragm, these current properties are controlled by the two microswitches 24 and 25 previously mentioned and other features.

This is best understood by reference to FIGURE 13 which is a schematic diagram showing the electrical relationships of the various apparatus components. The entire apparatus is energized by an A.C. voltage of 115 volts being applied between 60 and 61 when the tube rotor hand switch on the control panel of the X-ray machine is closed to start the rotation of the target of the X-ray tube. The electrical connection for this voltage and other electrical connections to the X-ray machine are conveniently made through a single terminal fitting 81 mounted in the side of the housing 27. The voltage 60–61 is applied to a rectifier 62 having a D.C. output which passes through a variable resistor 63 and the contacts 64 of a two position current reversing relay 72. The contacts 64 of the relay 72 are current reversing and in one position will cause the current from the rectifier 62 to flow in one direction through the solenoid 23 and in the other position will cause the current to flow in the opposite direction through the solenoid 23. However, the initial flow of current through the solenoid 23 upon the closing of the tube rotor hand switch will be in one direction or the other depending upon the position of contacts 64 when the last previous use of the X-ray equipment terminated.

Regardless of the direction of initial current in the solenoid 23, voltage 60–61 will cause the rod component 21 or plunger 48 to be propelled from its neutral or at rest position in the mid point of its travel toward one or the other pipe fitting 26. This initial motion of the rod component 21 or plunger 48 will cause the actuation of microswitch 24 or 25 by the bulge in tube 20, the actuator 49 or the magnetic influence of segment 53 or 54. The actuation of either of these microswitches will place the apparatus in a home or start position by closing the circuit 65 necessary for the relay 72 to receive the voltage signal from the X-ray exposure hand switch on the control panel of the X-ray machine which it used to initiate reciprocating motion of the grid structure 38 of the Bucky Diaphragm. This voltage signal is applied between terminals 60 and 66 and causes current to flow to the relay 72 through whichever of the two microswitches 24 or 25 is actuated. In either case the flow of current through microswitch 24 or 25 will cause the position of contacts 64 to be reversed by relay 72 and will reverse the current flow to the solenoid 23. This current reversal in solenoid 23 starts rod component 21 or plunger 48 to move in a direction opposite to its initial movement. Although microswitch 24 or 25 is released by this motion, the current in solenoid 23 remains the same until the other microswitch 24 or 25 is actuated. Thus, the new motion continues.

The voltage signal from the exposure hand switch is also applied to circuit 67 through whichever microswitch 24 or 25 is not initially actuated by rod component 21 or plunger 48 movement. The current in this circuit 67 resulting from the operation of the X-ray exposure hand switch passes through variable resistor 68 and coil 69 and will in coil 69 cause two contacts to close. One of these contacts 80 provides current to the coil of the X-ray exposure relay 70 whose contact 82 is thereby closed to initiate a signal voltage 71 to the X-ray timing device and exposure contact on the control panel of the X-ray machine. Thus, X-ray exposure and the timing of X-ray exposure is initiated.

The other contact 79 operated by coil 69 provides a lock in circuit for the current through the coil 69. This is necessary to insure that coil 69 will not temporarily lose current because of the failure of either microswitch 24 or 25 to complete circuit 67 after it has been actuated to close circuit 65 and released. Such a loss of current in coil 69 would result in the temporary opening of the contact 82 held closed by the X-ray exposure relay 70 and which upon reclosing would restart the entire X-ray exposure sequence initiated by the closing of the contact 82.

As the rod component 21 or plunger 48 moves under the influence of the solenoid 23, it will eventually strike the other microswitch 24 or 25. This action will cause the voltage 60-66 to be again applied to the relay 72. However with this application of voltage, the current flow in circuit 65 is in the opposite direction through the coil of relay 72 from that during the initial application of this voltage 60-66 and will cause the relay 72 to reverse the position of contacts 64 and the direction of current through the solenoid 23. When this current reversal to solenoid 23 occurs the rod component 21 or plunger 48 reverses its direction of motion and continues in this new direction until the other microswitch 24 or 25 is once again actuated to cause another reversal of current to the solenoid 23 in the manner previously described. Thus, the rod component 21 or plunger 48 moves backward and forward during the period of X-ray exposure and will discontinue its reciprocating motion only when the input voltages to the pressure generating device are terminated by the end of the X-ray exposure time. From what has already been said, it is obvious that this backward and forward motion of the rod component 21 or plunger 48 will cause corresponding pulsating changes in conduits 32 or bellows 58 and that these changes will in turn cause reciprocating motion of the grid structure 38 of the Bucky Diaphragm during the exposure of the X-ray film.

There are several features of the apparatus which should be emphasized at this point. For example, adjustment of the variable resistor 63 varies the amplitude of the electrical current in the circuit to the solenoid 23 and permits adjustment of the speed at which the rod component 21 or plunger 48 is moved by the solenoid 23. Therefore, the speed of reciprocating motion imparted to the grid structure 38 of a Bucky Diaphragm by the apparatus is relatively adjustable. In addition, it should be emphasized that by adjusting the positions on brackets 73 of the microswitches 24 and 25, it is possible to conveniently adjust the length of the rod component 21 or plunger 48 travel. Thus, a convenient and simple method is provided for adjusting the length of reciprocating motion imparted by them to the grid structure 38. The frequency of reciprocating motion is conveniently varied by adjusting the speed of rod component 21 or plunger 48 motion for a particular length of motion.

Moreover, the use of the variable resistor 68 permits an adjustable time delay between the start of rod component 21 or plunger 48 motion and the start of X-ray exposure because the speed with which coil 69 closes its contacts will vary with the voltage applied. It should be noted that this time delay feature is particularly useful for adjusting the apparatus to compensate for delays in the response of the grid structure 38 to rod component 21 or plunger 48 motion because of varying lengths of the leads 45 between the pressure generating device and the pressure responsive device. Similarly, this time delay feature can be used to vary the time of starting X-ray exposure with reference to the start of actual grid structure 38 motion. Singularly and taken together these various convenient adjustments of the response and performance of the apparatus provide a highly flexible and useful means for imparting reciprocating motion to a structure.

From the foregoing, it is apparent that the apparatus described herein not only provides a highly convenient, durable and easily maintained means for imparting reciprocating motion to a structure, but that it may be used to impart such motion to a structure under a variety of circumstances and conditions. For example, FIGURE 14 shows a pressure generating device which is completely enclosed in a housing 77 and which can be placed in a position remote from a pressure responsive device such as that shown in FIGURE 15 associated with a Bucky Diaphragm mechanism mounted on a conventional X-ray vertical cassette changer 74. With this arrangement of the devices, the control mechanisms associated with the pressure generating device are remotely located from the structure to which reciprocating motion is imparted and the housing 75 for the structure and the pressure responsive device can be considerably smaller than would be required for conventional methods for imparting reciprocating motion. The advantages of a thin housing 75 for the grid structure 38 of a Bucky Diaphragm should be apparent. Moreover, as already noted, the remote location of the mechanical and electrical components associated with the control of reciprocating motion is particularly significant where the structure to be moved is in an explosive environment or an environment which damages such components unless elaborate measures are taken to protect them.

The versatility of the apparatus described herein with respect to its application is further emphasized in FIGURE 16 which shows both a pressure generating device and a pressure responsive device installed in a conventional Bucky Diaphragm housing 76. It can be seen that even when used in this manner, the apparatus described herein provides a compact and useful means for imparting reciprocating motion to the grid structure 38 of a Bucky Diaphragm.

What is claimed as invention is:

1. A device for alternately exerting pressure on either of two enclosed fluids comprising, in combination, a resilient cylindrical tube having two ends and a hollow interior with a diameter; a rod component positioned inside a portion of the resilient tube between the ends of the resilient tube, said rod component having a length and a diameter which is sufficiently greater than the diameter of the interior of the tube to cause the tube to bulge in the portion surrounding the rod component; two microswitches, one positioned adjacent to the tube between one end of the tube and the portion of the tube surrounding the rod component and the other positioned adjacent to the tube between the other end of the tube and the portion of the tube surrounding the rod component and both having an operating contact; two actuating levers, one attached at one end to one microswitch and the other attached at one end to the other microswitch and each positioned so that the unattached end is contiguous to the tube in that tube portion adjacent to its associated microswitch and will be moved by the bulge in the tube to operate the contact of its associated microswitch; a solenoid surrounding the tube and having the midpoint of its length approximately coinciding with the mid point of the rod component length; means for supplying electrical current to the solenoid; means for reversing the flow of electrical current to the solenoid from the supply means, said means being responsive to the alternate operation of the microswitches; two fluids, one filling the interior of the tube between one end of the tube and the rod component and the other filling the interior of the tube between the other end of the tube and the rod component.

2. A device for imparting linear motion to a structure in response to changes in the volumes of two fluids comprising, in combination, two resilient cylindrical conduits having their center lines in planes perpendicular to the line of linear motion of the structure and positioned against opposite sides of the structure in locations which cause the sides of the structure to distort their circular cross sections by shortening the diameter which coincides with the line of linear motion of the structure and by lengthening the diameter which is perpendicular to said line of linear motion, sufficient fluid to completely fill the interiors of both conduits when said conduits are both equally distorted by the sides of the structure adjacent to them, means for increasing the volume of the fluid in one conduit while simultaneously decreasing the volume of fluid in the other conduit by an equal amount.

3. A device for imparting reciprocating motion to a structure comprising, in combination, two expandable-collapsible means having their directions of expansion and collapse coinciding with a line of motion of the structure and both attached to the structure in such a manner that the expansion of one and the collapse of the other imparts a motion in one direction to the structure, sufficient fluid to completely fill the interiors of both expandable-collapsible means when they are both partially collapsed to the same degree, and means for increasing the fluid in one expandable-collapsible means while simultaneously decreasing the fluid in the other expandable-collapsible means by an equal amount.

4. A device for selectively exerting pressure on one of two fluids comprising, in combination, a plunger having two ends and movable in either direction along its center line, two expandable-collapsible means having their directions of expansion and collapse coinciding with the line of motion of the plunger and both mechanically associated with the plunger so that one expands and the other collapses as the plunger moves, sufficient fluid to completely fill the interiors of both expandable-collapsible means when they are both partially collapsed, and means other than the two said expandable-collapsible means for selectively moving the plunger in either direction along its line of motion.

5. A pressure generating device for selectively exerting pressure on two enclosed fluids comprising, in combination, a length of tube having two ends and a hollow interior; a rod component positioned inside a portion of the length of the tube which is between the two ends, said rod having two permanent magnet segments joined by a shaft segment; two fluids, one filling the interior of the tube between one end of the tube and the rod component and the other filling the tube between the other end of the tube and the rod component; and means for selectively inducing lines of electromagnetic flux in the rod component.

6. A device for alternately exerting pressure on either of two enclosed fluids comprising, in combination, a cylindrical tube having two ends and a hollow interior; two permanent magnet segments positioned inside a portion of the tube between the ends of the tube and with their magnetic fields opposed and oriented along the center line of the tube; a shaft segment joining the permanent magnet segments; two microswitches, one positioned adjacent to the tube between one end of the tube and the portion of the tube surrounding one permanent magnet segment and the other one positioned adjacent to the tube between the other end of the tube and the portion of the tube surrounding the other permanent magnet segment and both having an operating contact; two actuating levers, one attached at one end to one microswitch and the other attached at one end to the other microswitch and each positioned so that its unattached end is near to that portion of the tube adjacent to its associated microswitch and will operate the contact of such microswitch when it moves away from the tube; two small permanent magnets, one associated with the unattached end of one actuating lever and the other associated with the unattached end of the other actuating lever and each positioned so that its polarity nearest to the tube is the same as the polarity of the ends of the permanent magnet segments which are most remote from the shaft segment; a solenoid coil surrounding the tube and having the midpoint of its length approximately coinciding with the midpoint of the distance between the permanent magnet segments; means for supplying electrical current to the solenoid; means for reversing the flow of electrical current to the solenoid from the supply means, said means being responsive to the alternate operation of the microswitches; two fluids, one filling the interior of the tube between one end of the tube and one permanent magnet segment and the other filling the interior of the tube between the other end of the tube and the other permanent magnetic segment.

7. A solenoid with a plunger selectively movable in either of two directions away from the solenoid comprising, in combination, a solenoid coil with a center line generally corresponding to the orientation of its magnetic field when energized by current; a plunger movably positioned inside the solenoid coil, said plunger having two permanent magnet segments with their magnetic fields opposed and oriented along the center line of the solenoid coil and a shaft segment extending parallel to the center line of the solenoid coil to join the permanent magnet segments; and means for selectively introducing electrical current into the solenoid coil so that the magnetic field of the solenoid coil can be selectively reversed in polarity.

8. A pressure generating device for exerting pressure on an enclosed liquid comprising, in combination, a length of tube having an end and a hollow interior; a rod component movably positioned inside a portion of the length of the tube so that the rod component's centerline corresponds to the centerline of the tube and so that it forms a fluid tight barrier within the tube, said rod component having two permanent magnet segments joined by a shaft segment; a solenoid coil surrounding the tube; fluid filling the interior of the tube between its end and the length of the tube occupied by the rod component; and means for introducing electrical current into the solenoid coil in order to create an electromagnetic field in the space surrounded by the coil.

9. A switch operated by a magnetic field of a particular polarity comprising, in combination, a microswitch with an operating contact, an actuating lever with one end attached to the microswitch and with the other end unattached and positioned so that it engages the operating contact of the microswitch when moved toward the microswitch, a permanent magnet attached to the unattached end of the actuaing lever and positioned so that its polarity most remote from the microswitch is opposite the particular polarity of the magnetic field.

References Cited by the Examiner

UNITED STATES PATENTS

| | | | |
|---|---|---|---|
| 936,648 | 10/09 | Marshall | 200—87.3 X |
| 1,737,388 | 11/29 | Redmond | 310—34 |
| 2,084,368 | 6/37 | Wynn | 60—54.5 X |
| 2,112,098 | 3/38 | Johnson | 200—87.3 X |
| 2,456,869 | 12/48 | Fowler | 137—785 |
| 2,598,954 | 6/52 | Wengel | 310—39 |
| 2,627,183 | 2/53 | Greenwood et al. | 137—785 |
| 2,658,970 | 11/53 | Hurley | 200—84.3 |
| 2,659,390 | 11/53 | MacLea et al. | 137—785 |
| 2,686,280 | 8/54 | Strong et al. | 310—30 X |
| 2,689,916 | 9/54 | Lohman et al. | 250—63 |
| 2,733,352 | 1/56 | Billin | 250—62 |
| 2,767,323 | 10/56 | Stava et al. | 250—62 |
| 2,910,092 | 10/59 | Williams | 137—785 |
| 2,924,944 | 2/60 | Matlachowsky | 60—54.5 |
| 2,997,849 | 8/61 | Shimanckas | 60—54.5 |

FOREIGN PATENTS 378,185   1/40   Italy.

EDGAR W. GEOGHEGAN, *Primary Examiner.*
ARTHUR GAUSS, RALPH NILSON, ROBERT R. BUNEVICH, JULIUS E. WEST, *Examiners.*